(12) United States Patent
Duelm et al.

(10) Patent No.: US 9,328,626 B2
(45) Date of Patent: May 3, 2016

(54) ANNULAR TURBOMACHINE SEAL AND HEAT SHIELD

(75) Inventors: Shelton O. Duelm, Wethersfield, CT (US); Stephanie Ernst, Meriden, CT (US); Eric Charles Mundell, South Berwick, ME (US); Robert C. Stutz, Dobbs Ferry, NY (US)

(73) Assignee: United Technologies Corporation, Hartford, CT (US)

(*) Notice: Subject to any disclaimer, the term of this patent is extended or adjusted under 35 U.S.C. 154(b) by 761 days.

(21) Appl. No.: 13/590,348

(22) Filed: Aug. 21, 2012

(65) Prior Publication Data

US 2014/0056685 A1   Feb. 27, 2014

(51) Int. Cl.
| | |
|---|---|
| *F01D 11/00* | (2006.01) |
| *F01D 25/08* | (2006.01) |
| *F02C 7/28* | (2006.01) |
| *F01D 11/02* | (2006.01) |
| *F02C 7/24* | (2006.01) |

(52) U.S. Cl.
CPC ............... *F01D 25/08* (2013.01); *F01D 11/00* (2013.01); *F01D 11/02* (2013.01); *F02C 7/24* (2013.01); *F02C 7/28* (2013.01); *F05D 2230/53* (2013.01); *F05D 2240/15* (2013.01); *F05D 2260/231* (2013.01)

(58) Field of Classification Search
CPC ......... F01D 11/00; F01D 11/02; F01D 25/08; F01D 25/125
USPC .................. 277/409, 411, 412, 416, 418; 415/170.1, 171.1, 173.1–174.3, 174.5
See application file for complete search history.

(56) References Cited

U.S. PATENT DOCUMENTS

| | | | |
|---|---|---|---|
| 2,930,662 | A | 3/1960 | Henstridge |
| 3,312,448 | A | 4/1967 | Witlicki |
| 4,709,545 | A | 12/1987 | Stevens et al. |
| 4,793,772 | A | 12/1988 | Zaehring et al. |
| 4,987,736 | A | 1/1991 | Ciokajlo et al. |
| 5,180,279 | A | 1/1993 | McLane-Goetz et al. |
| 5,211,541 | A | 5/1993 | Fledderjohn et al. |
| 5,226,788 | A | 7/1993 | Fledderjohn |
| 5,252,026 | A | 10/1993 | Shepherd |
| 5,284,347 | A * | 2/1994 | Pope ............................ 277/305 |
| 5,399,066 | A | 3/1995 | Ritchie et al. |
| 5,464,227 | A | 11/1995 | Olson |
| 5,622,438 | A | 4/1997 | Walsh et al. |
| 5,656,353 | A | 8/1997 | Butler |

(Continued)

FOREIGN PATENT DOCUMENTS

EP    1512840 A2 *  3/2005  .............. F01D 11/02

OTHER PUBLICATIONS

International Search Report for International Application No. PCT/US2013/055489 dated Nov. 4, 2013.

(Continued)

*Primary Examiner* — Igor Kershteyn
*Assistant Examiner* — Woody A Lee, Jr.
(74) *Attorney, Agent, or Firm* — Carlson, Gaskey & Olds, P.C.

(57) ABSTRACT

An example annular turbomachine seal includes an attachment portion, a first leg radially inward of the attachment portion, and a second leg radially inward of the attachment portion and configured to block flow from directly contacting an attachment associated with a bearing compartment of a turbomachine.

19 Claims, 4 Drawing Sheets

(56) References Cited

U.S. PATENT DOCUMENTS

| | | | |
|---|---|---|---|
| 6,196,790 B1 | 3/2001 | Sheridan et al. | |
| 7,287,384 B2 | 10/2007 | Fish et al. | |
| 7,410,341 B2 | 8/2008 | Gockel et al. | |
| 7,909,570 B2* | 3/2011 | Durocher et al. | 415/174.5 |
| 2003/0185669 A1* | 10/2003 | Brauer et al. | 415/111 |
| 2004/0168443 A1 | 9/2004 | Moniz et al. | |
| 2005/0089399 A1* | 4/2005 | Bart et al. | 415/170.1 |
| 2006/0233642 A1 | 10/2006 | Wunderlich et al. | |
| 2009/0226306 A1* | 9/2009 | Boeck et al. | 415/173.1 |
| 2012/0177495 A1 | 7/2012 | Virkler et al. | |
| 2012/0189429 A1 | 7/2012 | Witlicki | |
| 2013/0115057 A1* | 5/2013 | Suciu et al. | 415/170.1 |

OTHER PUBLICATIONS

International Preliminary Report on Patentability for PCT Application No. PCT/US2013/055489, mailed Mar. 6, 2014.

Extended European Search Report for European Application No. 13831730.0 mailed Oct. 23, 2015.

\* cited by examiner

ANNULAR TURBOMACHINE SEAL AND HEAT SHIELD

BACKGROUND

This disclosure relates generally to a turbomachine seal and, more particularly, to a turbomachine seal that limits thermal energy movement to a bearing compartment.

Turbomachines, such as gas turbine engines, typically include a fan section, a compression section, a combustion section, and a turbine section. Turbomachines may employ a geared architecture connecting portions of the compression section to the fan section.

Hot gases move through the turbomachine during operation. High levels of thermal energy are not desirable in some areas of the turbomachine as is known. For example, too much thermal energy in the bearing compartment may undesirably coke lubricant in the bearing compartment.

SUMMARY

An annular turbomachine seal according to an exemplary aspect of the present disclosure includes, among other things, and attachment portion, a first leg radially inward of the attachment portion, and a second leg radially inward of the attachment portion. The second leg is configured to block flow from directly contacting an attachment associated with a bearing compartment of a turbomachine.

In a further nonlimiting embodiment of the foregoing seal, the second leg may be configured to seal against the bearing compartment.

In a further nonlimiting embodiment of either of the foregoing seals, the second leg may extend exclusively in a radial direction.

In a further nonlimiting embodiment of any of the foregoing seals, the second leg may extend from the attachment portion radially past the attachment.

In a further nonlimiting embodiment of any of the foregoing seals, the first leg may extend axially forward of the second leg.

In a further nonlimiting embodiment of any of the foregoing seals, a portion of the first leg and the second leg are radially aligned.

In a further nonlimiting embodiment of any of the foregoing seals, a portion of the first leg and a portion of the second leg are radially aligned with the attachment.

In a further nonlimiting of any of the foregoing seals, the attachment portion, the first leg, and the second leg are formed as a single monolithic structure.

In a further nonlimiting embodiment of any of the foregoing seals, a third leg is may be radially outboard of the attachment portion, the third leg may be configured to provide a seal with a turbine section of the turbomachine.

In a further nonlimiting embodiment of any of the foregoing seals, the attachment portion may provide a plurality of apertures that are each configured to receive a fastener that secures the attachment portion directly to a low-pressure turbine section of the turbomachine.

In a further nonlimiting embodiment of any of the foregoing seals, the attachment portion, the first leg, and the second leg may each extend circumferentially about an axis of the turbomachine.

A shield according to another exemplary aspect of the present disclosure includes, among other things, a wall that is spaced axially forward from a portion of a bearing compartment. The wall is configured to redirect an axial flow from a turbine section of a turbomachine. The axial flow moves toward the portion of the bearing compartment through a channel provided at least partially by a turbine rotor.

In a further nonlimiting embodiment of the foregoing shield, the wall may extend from a first radial side of a bearing compartment fastener to an opposing, second radial side of the bearing compartment fastener.

In a further nonlimiting embodiment of either of the foregoing shields, a radially innermost end of the wall may be configured to establish a seal with at least a portion of the bearing compartment.

In a further nonlimiting embodiment of any of the foregoing shields, the first wall may be positioned axially between a high-pressure turbine and a low-pressure turbine of a turbomachine.

In a further nonlimiting embodiment of any of foregoing shields, the wall extends radially outward from a heat shield of the bearing compartment.

A method of limiting thermal energy movement to a bearing compartment according to an exemplary aspect of the present disclosure includes, among other things, moving flow through a channel provided by shield in a turbine rotor, and redirecting flow from the channel away from the bearing compartment using a wall of the shield that is axially spaced from the channel.

In a further nonlimiting embodiment of the foregoing method of limiting thermal energy movement, the method may include sealing against the bearing compartment with the wall.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
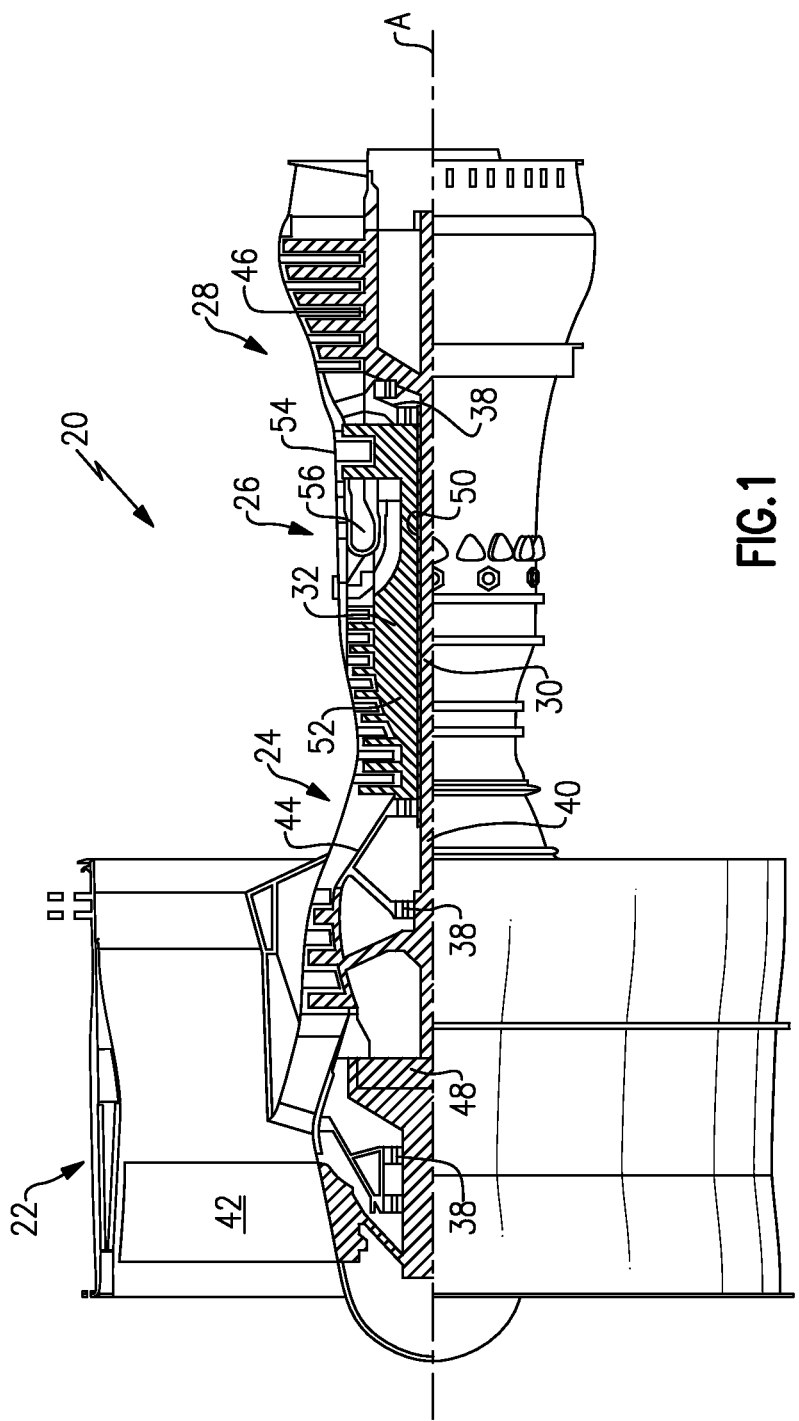
FIG. 1 shows a schematic view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications, such as automotive applications.

In the example engine 20, flow moves from the fan section 22 to a bypass flowpath. Flow from the bypass flowpath generates forward thrust. The compression section 24 drives air along the core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

Low Corrected Fan Tip Speed is the actual fan tip speed divided by an industry standard temperature correction of Temperature divided by 518.7^0.5. The Temperature represents the ambient temperature in degrees Rankine. The Low Corrected Fan Tip Speed according to one non-limiting embodiment of the example engine 20 is less than about 1150 fps (351 m/s).

Figure 2:
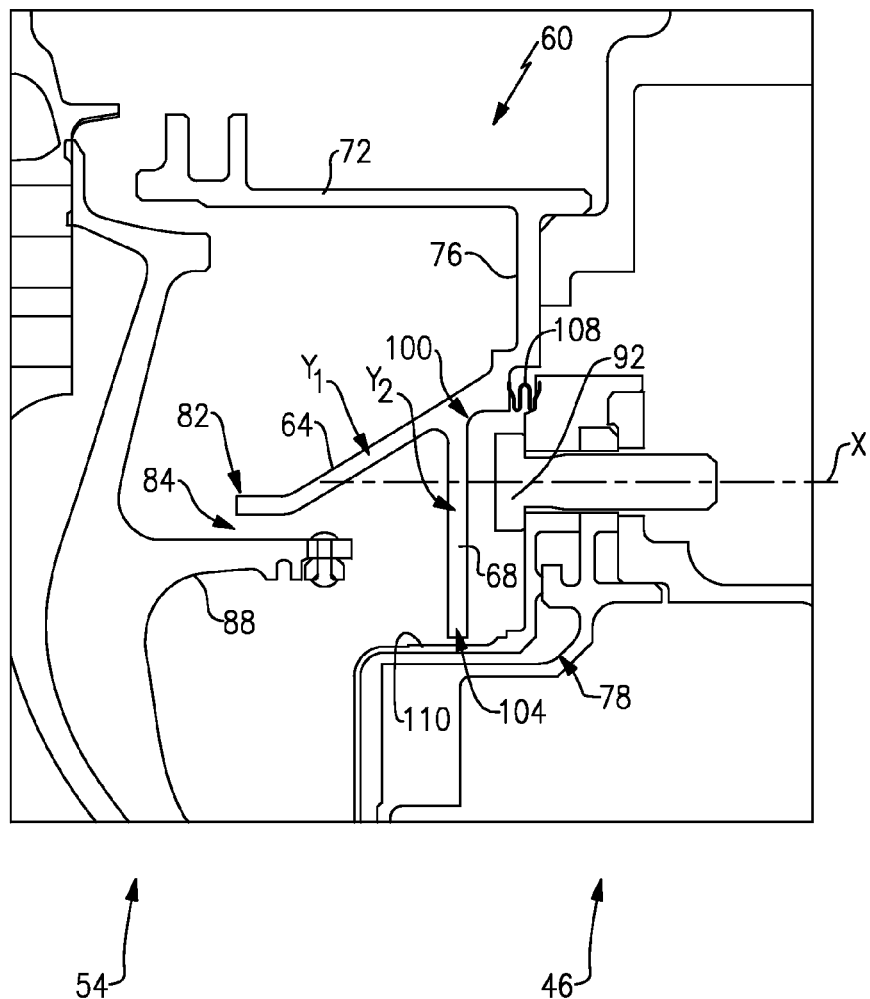
FIG. 2 shows a section view of an annular turbomachine seal within the turbomachine of FIG. 1.
Figure 3:
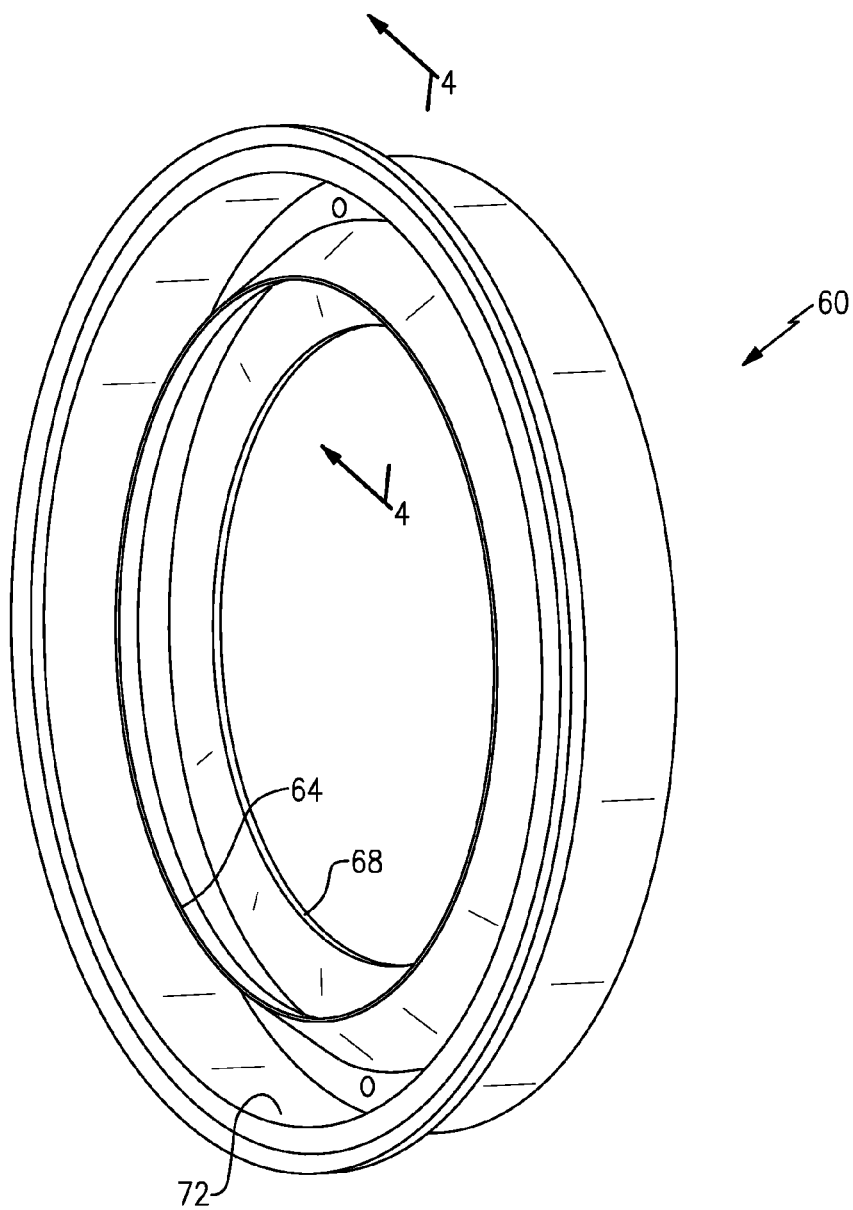
FIG. 3 shows a perspective view of the FIG. 2 annular turbomachine seal.
Figure 4:
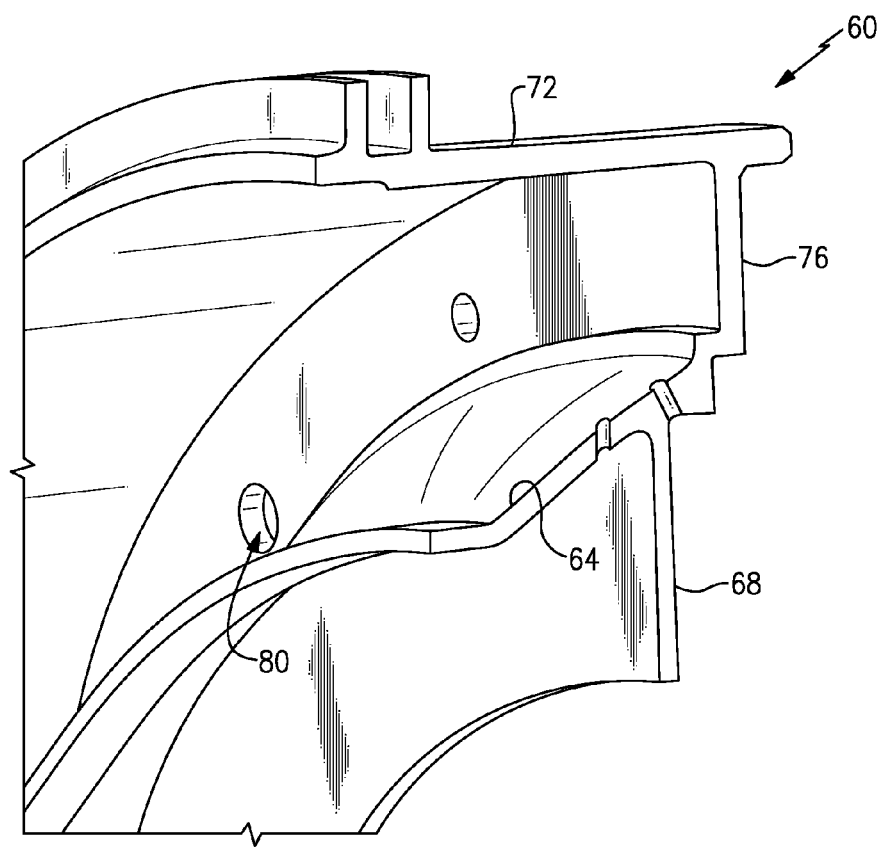
FIG. 4 shows a section view at line 4-4 in FIG. 3.

Referring to FIGS. 2 to 4 with continuing reference to FIG. 1, an example turbomachine seal 60 includes a first leg 64, a second leg 68, a third leg 72, and an attachment portion 76. The example seal 60 is a single monolithic structure. That is, the first leg 64, the second leg 68, the third leg 72, and the attachment portion 76 are forged together as a single piece.

The seal 60 is an annular seal that extends circumferentially about the entire axis A. In this example, the first leg 64, the second leg 68, the third leg 72, and the attachment portion 76 each include at least a portion that extends about the entire axis A.

The example seal 60 is positioned within the engine 20 within or near a mid-turbine frame that is between the high-pressure turbine 54 and the low-pressure turbine 46. The seal 60 is adjacent a bearing compartment 78 of the engine 20. The bearing compartment 78 houses some of the bearings 38. The attachment portion 76 provides a plurality of apertures 80 that receive fasteners (not shown). The fasteners secure the seal 60 to a portion of the low-pressure turbine 46 (or mid-turbine frame).

The first leg 64 extends from the attachment portion 76 generally upstream relative to a direction of flow of the engine 20, and radially toward the axis A. An end portion 82 of the first leg 64 establishes a radially outer boundary of a channel 84. A rotor 88 of the high-pressure turbine 54 establishes a radially inner boundary of the channel 84.

In this example, the second leg 68 blocks flow from directly contacting a fastener 92 that secures other portions of the bearing compartment 78 within the engine 20. Blocking flow from directly contacting the fastener 92 limits thermal energy movement into the bearing compartment 96 from the flow. In the prior art, such fasteners may have acted as a conduit that facilitated movement of thermal energy into the bearing compartment.

The second leg 68 may be considered a wall or barrier in some examples. The example second leg 68 extends exclusively in a radial direction from the attachment portion 76 toward the axis A. In other examples, the second leg 68 may be angled relative to an exclusively radial direction.

The example second leg 68 has a portion 100 that is radially outside the fastener 92 and a portion 104 that is radially inside the fastener 92. The second leg 68 is thus considered to extend from a first radial side of the fastener 92 to an opposing, second radial side of the fastener 92. In some examples, the portion 104 effectively seals against a portion of the bearing compartment 78, such as a heat shield 110 associated with the bearing compartment.

The example second leg 68 extends from the seal 60. In another example, the second leg 68 may extend radially outward from the heat shield 110.

The fastener 92 extends generally along an axis X. The first leg 64 and second leg 68, in this example, each include portions ($Y_1$ and $Y_2$, respectively) that are radially aligned with the faster 92.

The third leg 72 extends in a generally axial direction in this example. The third leg 72 may seal against a portion of the high-pressure turbine 54.

A seal 108, such as a "W" type seal may be used between the seal 60 and the radially outermost portion of the attachment portion 76 to block flow that has moved around the second leg 68.

Features of the disclosed examples include a leg or wall that acts as a barrier to block a relatively hot flow from directly contacting a bearing compartment fastener. Blocking this flow reduces heating of the bearing compartment due to the flow.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An annular turbomachine seal, comprising:
   an attachment portion;
   a first leg extending directly from the attachment portion radially inward of the attachment portion; and
   a second leg extending directly from the attachment portion radially inward of the attachment portion and configured to block flow from directly contacting a fastener associated with a bearing compartment of a turbomachine, wherein both the first leg and the second leg are configured to extend from the attachment portion on a first side of the fastener radially past the fastener to an opposing, second radial side of the fastener, the second leg axially spaced from the fastener; and
   wherein the turbomachine is a gas turbine engine.

2. The annular turbomachine seal of claim 1, wherein the second leg is configured to seal against the bearing compartment.

3. The annular turbomachine seal of claim 1, wherein second leg extends exclusively in a radial direction.

4. The annular turbomachine seal of claim 1, wherein the first leg extends axially forward of the second leg.

5. The annular turbomachine seal of claim 1, wherein at least a portion of the first leg and a portion of the second leg are radially aligned at a common radial position.

6. The annular turbomachine seal of claim 1, wherein at least a portion of the first leg and at least a portion of the second leg are radially aligned with the fastener at a common radial position.

7. The annular turbomachine seal of claim 1, wherein the attachment portion, the first leg, and the second leg are formed as a single monolithic structure.

8. The annular turbomachine seal of claim 1, including a third leg radially outward of the attachment portion, the third leg configured to provide a seal with a turbine section of the turbomachine.

9. The annular turbomachine seal of claim 1, wherein the attachment portion provides a plurality of apertures each configured to receive the fastener, the fastener securing the attachment portion directly to a low pressure turbine section of the turbomachine.

10. The annular turbomachine seal of claim 1, wherein the attachment portion, the first leg, and the second leg each extend circumferentially about an axis of the turbomachine.

11. The annular turbomachine seal of claim 1, wherein the fastener is a bearing compartment fastener.

12. A shield comprising:
    a wall spaced axially forward from at least a portion of a bearing compartment of a gas turbine engine, wherein the wall is configured to redirect an axial flow from a turbine section of the gas turbine engine, the axial flow moving toward the portion of the bearing compartment from a channel provided on a radially inner side by a turbine rotor and on a radially outer side by a leg extending directly from an attachment portion, the channel terminating at an outlet, the wall spaced axially downstream from the outlet relative to a direction of flow through the channel.

13. The shield of claim 12, wherein the wall extends from a first radial side of a bearing compartment fastener to an opposing, second radial side of the bearing compartment fastener.

14. The shield of claim 12, wherein a radially innermost end of the wall is configured to establish a seal with at least a portion of a bearing compartment.

15. The shield of claim 12, wherein the first wall is position axially between a high-pressure turbine and a low-pressure turbine of the gas turbine engine.

16. The shield of claim 12, wherein the wall extends radially outward past a heat shield of the bearing compartment.

17. The shield of claim 12, wherein the wall extends directly from the attachment portion.

18. A method of limiting thermal energy movement to a bearing compartment, comprising:
    moving flow through a channel toward a wall, the flow exiting the channel at an outlet, the channel provided by a shield and a turbine rotor, the wall downstream from the outlet relative to a general direction of through the channel; and
    redirecting flow from the channel away from a bearing compartment using the wall of the shield that is axially spaced from the channel; and
    wherein the bearing compartment is a bearing compartment of a gas turbine engine.

19. The method of claim 18, including sealing against the bearing compartment with the wall.

* * * * *